United States Patent [19]

Börner et al.

[11] Patent Number: 4,495,733

[45] Date of Patent: Jan. 29, 1985

[54] SCANNING FINGER FOR A SCANNING DEVICE OF A MACHINE FOR THE AUTOMATIC SHARPENING OF BROACHING OR REAMING TOOLS

[75] Inventors: Roland Börner; Herbert Holstein; Jürgen Sennewald, all of Solingen, Fed. Rep. of Germany

[73] Assignee: Oswald Forst Maschinenfabrik und Apparatebauanstalt GmbH & Co. KG, Solingen, Fed. Rep. of Germany

[21] Appl. No.: 399,884

[22] Filed: Jul. 16, 1982

[30] Foreign Application Priority Data

Aug. 8, 1981 [DE] Fed. Rep. of Germany ....... 3131557

[51] Int. Cl.³ .............................................. B24B 49/00
[52] U.S. Cl. ................................................. 51/165 R
[58] Field of Search ........... 51/72 L, 165 R, 216 ND, 51/92 ND, 34 C, 34 G, 35; 76/37

[56] References Cited

U.S. PATENT DOCUMENTS 3,646,593 2/1972 Schubert ...................... 51/216 ND
4,348,838 9/1982 Tacchella ........................ 51/165 R

FOREIGN PATENT DOCUMENTS 348069 9/1960 Switzerland .................. 51/216 ND

Primary Examiner—Harold D. Whitehead
Attorney, Agent, or Firm—Browdy and Neimark

[57] ABSTRACT

A scanning finger for a scanning device of a machine for automatically sharpening tools has a horizontal slide for receiving a tool to be ground and a vertical slide carrying at least one grinding spindle. The scanning finger has a scanning face, which is substantially horizontal and limited by and undercut to rest on the free face of a tool tooth to be ground, as well as a face which is downwardly offset from the scanning face and is intended for ascertaining the cutting face of the tooth. In order to make it possible to scan the cutting face at a distance from the original cutting edge, the face for ascertaining the cutting face of the tooth is undercut in the direction of movement of the horizontal slide and below the horizontal scanning face, and below the undercut it has a measuring edge to rest on the cutting face.

4 Claims, 6 Drawing Figures

SCANNING FINGER FOR A SCANNING DEVICE OF A MACHINE FOR THE AUTOMATIC SHARPENING OF BROACHING OR REAMING TOOLS

FIELD OF THE INVENTION

The invention relates to a scanning finger for a scanning device of a machine for the automatic sharpening of broaching or reaming tools which has a horizontal slide for receiving a tool to be ground and a vertical slide provided with at least one grinding spindle. The scanning device is oriented toward the grinding spindle, and the scanning finger is movable relative to the scanning device and coupled with at least one member which emits displacement-dependent signals for triggering the drive mechanisms of the slides. The scanning finger further has a substantially horizontal scanning face, limited by an undercut, for resting on the free face of a tooth of a broaching or reaming tool as well as a face which is downwardly offset from the scanning face and is intended for detecting the cutting face of the reaming tooth.

BACKGROUND OF THE INVENTION

Machines for the automatic sharpening of broaching or reaming tools of the general type described above, having a scanning device and a scanning finger, are known from U.S. Pat. No. 3,646,593 and are also available on the market. In these known machines, when there is an appropriate movement of the horizontal slide the scanning finger drops via the cutting edge of the reaming tooth of a broaching or reaming tool which is to be ground, and the horizontal slide is thus arrested. A radial advancement of the vertical slide having the grinding slide then occurs as well, in accordance with the vertical deflection of the scanning finger, which is resting with its horizontal scanning face on the free face of the reaming tooth. When the grinding slide having a grinding spindle is radially advanced in this manner, the scanning finger is raised from its scanning position in contact with the tooth, and the grinding disc is guided a plurality of times over the face to be ground, in accordance with an appropriately predetermined positioning. The next tooth is then ground. Because wear marks are often found on the worn cutting edge of a reaming tooth, that is, the edge which is now to be ground, and these marks cause errors in ascertaining the actual position of the cutting edge on the part of the scanning finger, an undercut is provided in front of the flat scanning face, so that the horizontal scanning face or rather its forward edge, defined by the undercut, rests on the free face of the tooth spaced apart from the cutting edge by a distance such that there are no further wear marks or the like. The face of the undercut along which the scanning finger drops downward via the worn cutting edge extends vertically. Machines of this general type for the automatic sharpening of broaching or reaming tools have become widely established and have proved themselves in practice.

However, it has been found in practice that very frequently, wear marks which cause errors in ascertaining the set-point position of the cutting edge also exist on the cutting face in the vicinity of the cutting edge. A further particularly important point is that naturally the worn edge is no longer a sharply defined edge, but rather an arc-like, curved face, so that errors in scanning occur. For this reason, it is efficacious to scan not only the free face but also the cutting face, at a predetermined distance from the location of the original, unworn cutting edge.

With respect to the above problem, it has become known from German laid-open application DE-OS No. 29 26 807 to use two scanning fingers, one of which scans the free face while the other scans the cutting face. This embodiment may be satisfactory in functional terms; however, because two scanning fingers have to be provided, it is expensive to build and also correspondingly more delicate.

SUMMARY OF THE INVENTION

It is accordingly an object of the present invention to embody a scanning finger of the general type discussed above in such a manner that it is possible to perform scanning of the cutting face at a distance from the original cutting edge.

This object is attained in accordance with the invention in that the scanning finger is undercut on the face for detecting the cutting face and has a measuring edge located below the undercut. In so doing as provided by the invention, it is attained in an astonishingly simple manner that a lower measuring edge of the scanning finger comes to rest against the cutting face, so that the original location of the cutting edge is ascertained precisely. Since the scanning finger is moved vertically and horizontally in a precise manner within a coordinate system, errors in measurement cannot occur. The embodiment of the scanning finger makes it possible to operate in the context of a so-called measuring grinding, in which the location of the original cutting edge is ascertained, regrinding is then performed, and a new measurement is then made, which may be followed as needed by a corrective grinding operation.

It is particularly advantageous that the undercut face is tilted more sharply relative to the vertical than is the cutting face the inclination of the undercut being in the range from 20° to 30° from the vertical.

Because a preliminary signal transducer in the form of a protrusion precedes the measuring edge, the precise measurement of the original location of the cutting edge can be accomplished in a particularly short time.

Further advantages and characteristics of the invention will become apparent from the ensuing detailed description of a preferred embodiment taken in conjunction with the drawings.

DESCRIPTION OF THE PREFERRED EMBODIMENT

Figure 1:
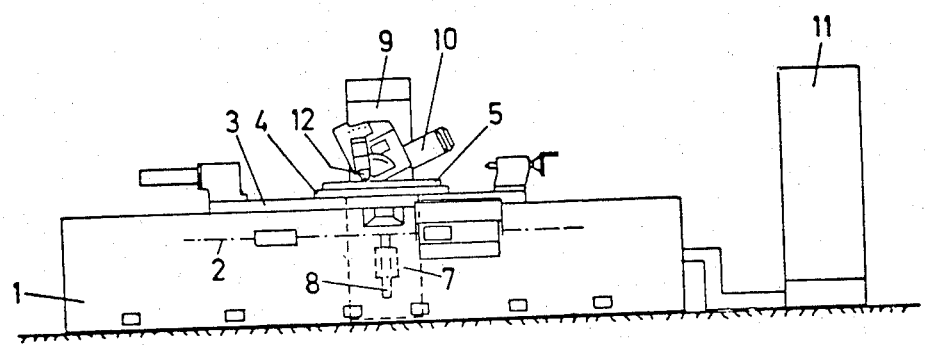
FIG. 1 is a schematic side view of a machine for the automatic sharpening of broaching or reaming tools.

As may be seen in FIG. 1, an automatic broaching or reaming tool sharpening machine has a horizontal slide 3 which is guided on a machine bed 1 and driven via a rolling spindle 2 by a servomotor disposed in the machine bed 1 but not visible in the drawing. The horizontal slide 3 carries a broaching or reaming tool 5, which is to be sharpened, on a magnetic clamping plate 4. The broaching tool sharpening machine further has a vertical slide 7 connected to the machine bed 1 and likewise driven via a rolling spindle 8 by a servomotor which is again not visible in the drawing. On its upper end, the vertical slide 7 carries a grinding slide 9, which is rotatably supported and has one or more grinding spindles 10. The grinding slide 9 is capable of reciprocating movement on the vertical slide 7, transversely to the horizontal slide 3 and thus perpendicular to the plane of the drawing in FIG. 1.

Switchboards or control panels 11 are also provided, which accommodate preprogrammable control devices for triggering the individual drive motors.

Disposed in the front part of the grinding spindle 10 is a scanning device 12, by means of which the geometry of the tool 5 to be ground is ascertained such that precise sharpening is possible. This previously described broaching tool sharpening machine is known in principle, for instance from U.S. Pat. No. 3,646,593, and is also available on the market.

Figure 2:
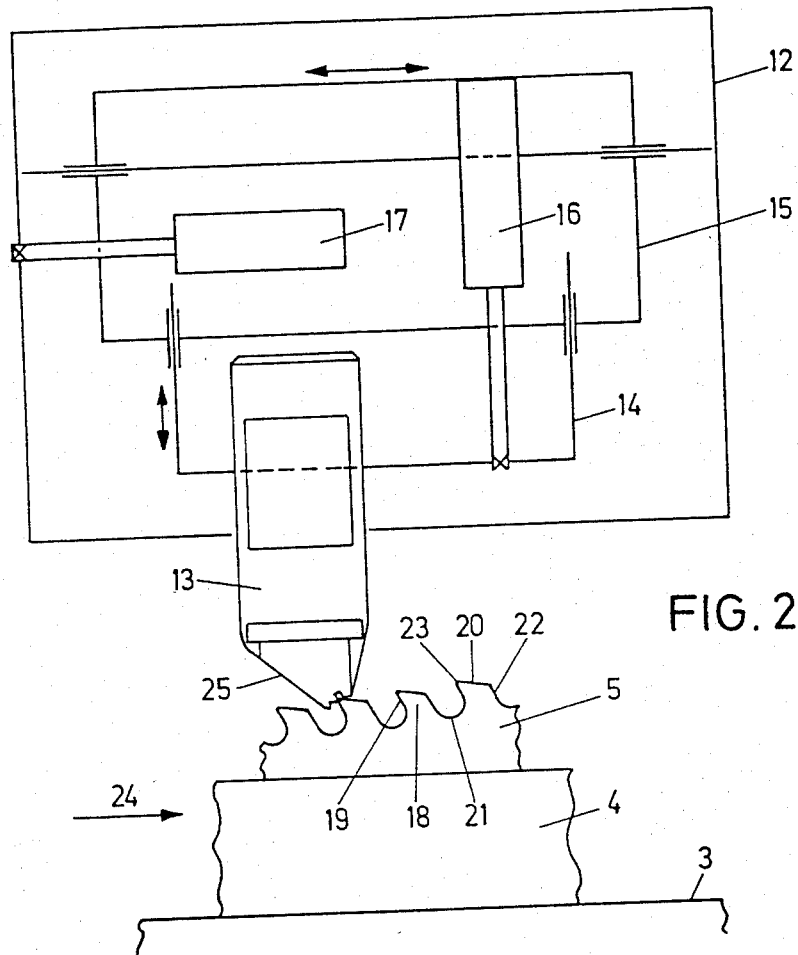
FIG. 2 shows, in schematic form, a scanning device having a scanning finger according to the present invention.
Figure 3:
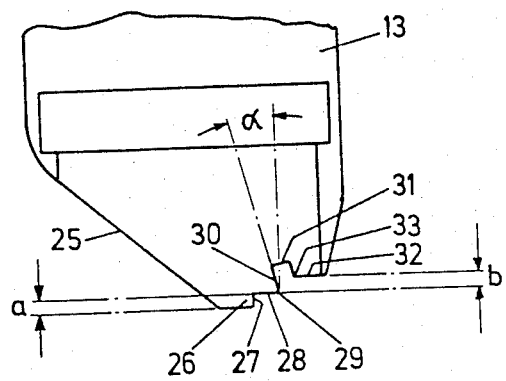
FIG. 3, on a greatly enlarged scale, shows the lower part of the scanning finger which comes to rest on a broaching or reaming tool.

The scanning device 12 is shown schematically in FIG. 2. A more-detailed illustration and description of this device is provided in a companion patent application, owned by the present assignee, filed on the same date as this application, and entitled "Scanning Device for a Machine for the Automatic Sharpening of Broaching or Reaming Tools", U.S. Ser. No. 399,885, the entire disclosure of which is hereby incorporated by reference as if here set forth in full.

Scanning device 12 has a scanning finger 13, which is releasably attached to a vertically displaceable slide 14. This vertically displaceable slide 14 is supported in a horizontally displaceable slide 15, so that the scanning finger 13 is capable of executing precise vertical and horizontal movements extending at right angles to one another, in fact in the same plane as that in which the tool 5, secured on the horizontal slide 3 so that it can be ground, is disposed. The two slides 14, 15 are each coupled with respective analog or digital displacement pickups 16, 17, so that movements of the scanning finger 13 relative to the scanning device 12 are converted into electrical signals, which are then converted again in the control devices mentioned earlier into corresponding trigger signals for the individual drive motors.

Figure 4:
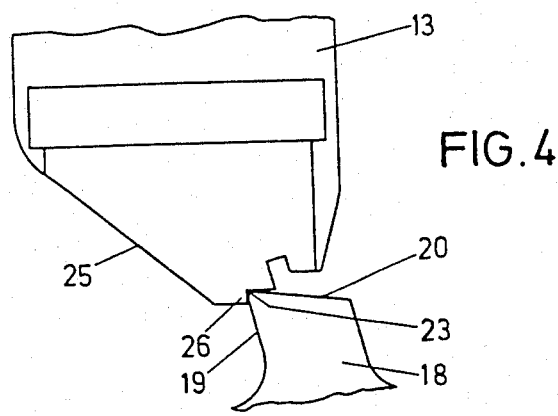
FIG. 4 shows the detail shown in FIG. 3 but with a reaming tooth in a pre-positioning location.
Figure 5:
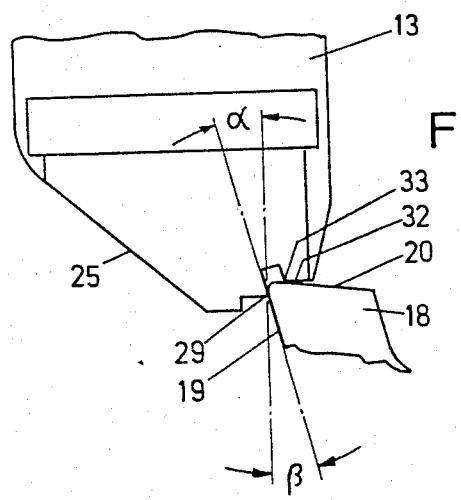
FIG. 5 shows the detail shown in FIG. 3 with a reaming tooth in a positioning location.

In the conventional fashion, the broaching or reaming tool 5 has reaming teeth 18, each of which has a cutting face 19 and a free face 20. The cutting face 19 of one tooth 18 merges with a chip chamber bottom 21 and then merges with the tooth back 22 of an adjacent tooth 18, which is then followed by its free face 20. The free face 20 and the cutting face 19, at the line where they intersect, form the cutting edge 23, which becomes worn in the course of reaming and—as is shown in particular detail in FIGS. 4 and 5—is no longer sharp but rather rounded after a certain period of operation.

In scanning the particular location of the cutting edge 23 of a reaming tooth 18, the horizontal slide 3 and the reaming tool 5 with it are moved as indicated by the arrow 24—that is, to the right as seen in the drawings. The scanning finger 13 now rests with a leading face 25 first against the tooth back 22 and then against the free face 20 of the corresponding tooth 18. During this movement, the scanning finger 13 is moved upward together with the slide 14, which causes a corresponding emission of signals by the displacement pickup 16. These signals may either be stored in memory or converted into a followup movement by the vertical slide 7 by means of an appropriate triggering of its drive motor.

Once a protrusion 26 adjoining the leading edge 25 reaches the (worn) cutting edge 23 of the corresponding tooth 18, then the scanning finger 13 drops downward a short distance a, which is within the range from 0.4 to 0.5 mm, as a result of which, because of the corresponding signal of the displacement pickup 16, the drive motor of the horizontal slide 3 is switched over from fast speed to a crawling speed. This protrusion 26 thus has the function of a preliminary signal transducer. This protrusion 26 is limited by the length a by means of an approximately vertical face 27 extending upward from the protrusion 26. The scanning finger 13 drops, as mentioned, downward along this face 27. A short abutment face 28 extending in the direction of movement 24 extends from the face 27 and rests with its highest point against the free face 20 once the protrusion 26 has dropped along the cutting edge 23.

During the slowed continued movement of the tool in the direction 24 which then occurs, the (worn) cutting edge 23 of the tooth 18 reaches a measuring edge 29, which is embodied on the line of intersection between the abutment face 28 and an undercut face 30 extending upward. The undercut angle, or in other words inclination angle $\alpha$ between the vertical and the undercut face 30 amounts to 30° and is in every instance larger than the maximum conventional chip angle $\beta$ between vertical and the chip face 19 (see FIG. 5). This undercut face 30 simultaneously defines an undercut 31 cut out from the scanning finger 13. A scanning face 32, in a known manner, adjoins this undercut 31. The vertical distance b between the measuring edge 29 and the scanning face 32 is in every instance larger than the largest actual rounding off of the cutting edge 23. The same is true for the minimum horizontal extension of the undercut 31.

Given the slowed further movement of the horizontal slide 3 in the direction 24 as already mentioned, once the measuring edge 29 is moved via the cutting edge 23 of the tooth 18, the scanning finger 13 drops downward. By means of an appropriate signal of the displacement pickup 16, the drive of the horizontal slide 3 is stopped and then is resumed in the opposite direction, that is, counter to the arrow 24, until the measuring edge 29 comes to rest against the cutting face 19. This abutment against the cutting face 19 takes place in every instance, for the reasons discussed above, below the rounded-off, worn area of the cutting edge 23. As a result of the deflection thus occurring on the part of the horizontally movable slide 15 and of the displacement pickup 17 coupled with it, a signal is emitted which now stops the horizontal slide 3 for good. The horizontal scanning face 32 or its forward or scanning edge 33, which is formed at the transition to the undercut 31, rests on the free face 20, in fact again in a vicinity which is freely away from the worn, rounded-off cutting edge 23. A radial advancement of the vertical slide 7 is now triggered via the displacement pickup 16, until the displacement pickup is again in balance. Thus the exact position of the reaming tooth 18 is ascertained, so that a precise regrinding of the cutting face 19 and/or of the free face 20 can be performed. After grinding, it is furthermore possible for a new measurement to be taken, in order to monitor whether the set-point dimension of the cutting edge 23 has been attained during the first grinding operation or not.

Figure 6:
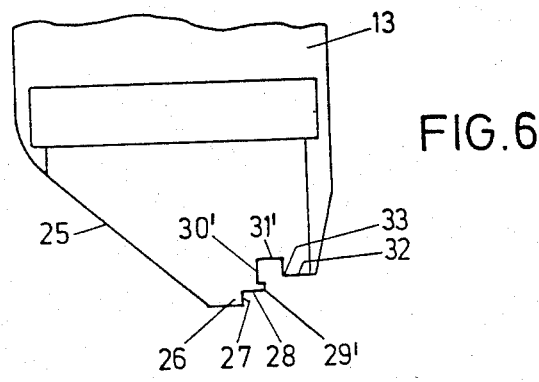
FIG. 6 shows the lower part of a modified scanning finger.

In the embodiment of the scanning finger according to FIG. 6, the undercut 31' extends directly above the measuring edge 29' in the direction toward the protrusion 26, so that the actual undercut face 30' no longer comes to rest against the chip face of a reaming tooth. Since all the areas and characteristics of the scanning finger 13 have otherwise remained unchanged, the same reference numerals are used in FIG. 6, and the elements need not be described again here.

It is to be understood that the foregoing text and drawing relate to embodiments of the invention given by way of example but not limitation. Various other embodiments and variants are possible within the spirit and scope of the invention.

What is claimed is:

1. An apparatus for use in a scanning device of a machine for the automatic sharpening of a cutting tooth of a tool said cutting tooth having a free face, a cutting face and a rounded-off cutting edge, which machine has a horizontal slide for receiving said tool having cutting teeth to be sharpened and a vertical slide provided with at least one grinding spindle, said apparatus comprising a scanning finger movable relative to the scanning device and coupled to at least one member for emitting signals in a displacement-dependent manner for triggering drive mechanisms for said slides; the scanning finger including:
    (a) a scanning face having a scanning edge being undercut to form (b) an undercut face, said undercut face defined at one end by said scanning edge and at the other end by (c) a measuring edge, for resting on said tooth cutting face, extending upwardly from (d) a face downwardly offset from the scanning face and intended for ascertaining the cutting face of the cutting tooth;
    said undercut face extending for a distance so that the horizontal distance between said measuring edge and said scanning edge is larger than the largest possible rounding-off of the cutting edge, said scanning edge being capable of resting upon said free face of said cutting tooth.

2. A scanning finger as defined by claim 1, wherein the scanning face is embodied as an undercut face limiting the undercut, and wherein said undercut face is inclined more sharply from the vertical than is the tooth cutting face.

3. A scanning finger as defined by claim 1, wherein the undercut face is inclined at an angle ($\alpha$) of 20° to 30° relative to the vertical.

4. A scanning finger as defined by claim 1, wherein the measuring edge is preceded by a protrusion which acts as a preliminary signal transducer.

* * * * *